US008069267B2

(12) United States Patent
Powers-Boyle et al.

(10) Patent No.: US 8,069,267 B2
(45) Date of Patent: Nov. 29, 2011

(54) ADVERTISEMENT REFRESH RULES FOR NETWORK APPLICATIONS

(75) Inventors: Elizabeth I. Powers-Boyle, San Francisco, CA (US); John A. Genna, Seattle, WA (US); Megan M. Schuller, Woodside, CA (US); Thomas A. Leung, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 11/168,273

(22) Filed: Jun. 28, 2005

(65) Prior Publication Data
US 2006/0294258 A1 Dec. 28, 2006

(51) Int. Cl.
*G06F 15/16* (2006.01)
*G06F 15/173* (2006.01)
*G06Q 30/00* (2006.01)

(52) U.S. Cl. ........ 709/246; 709/217; 709/219; 709/223; 709/224; 705/14.68

(58) Field of Classification Search .................. 709/217, 709/219, 223, 224, 246; 705/14, 50–500
See application file for complete search history.

(56) References Cited

U.S. PATENT DOCUMENTS

| | | | | |
|---|---|---|---|---|
| 2001/0044832 A1* | 11/2001 | Cohn et al. | ..................... | 709/217 |
| 2002/0010641 A1* | 1/2002 | Stevens et al. | .................. | 705/26 |
| 2003/0028433 A1* | 2/2003 | Merriman et al. | .............. | 705/14 |
| 2003/0061114 A1* | 3/2003 | Schwartz et al. | ................ | 705/26 |
| 2003/0065706 A1* | 4/2003 | Smyth et al. | ................... | 709/200 |
| 2003/0093315 A1* | 5/2003 | Sato | .................. | 705/14 |
| 2004/0059632 A1* | 3/2004 | Kang et al. | ........................ | 705/14 |
| 2005/0240475 A1* | 10/2005 | Margiloff et al. | ................ | 705/14 |
| 2006/0080166 A1* | 4/2006 | Takahashi | ......................... | 705/14 |
| 2006/0173747 A1* | 8/2006 | Gantman et al. | ................. | 705/26 |

OTHER PUBLICATIONS

Jakob Nielsen, "The Most Hated Advertising Techniques", http://www.useit.com/alertbox/20041206.html, Dec. 2004.

* cited by examiner

*Primary Examiner* — Ranodhi Serrao
*Assistant Examiner* — Farrukh Hussain
(74) *Attorney, Agent, or Firm* — Vierra Magen Marcus & DeNiro LLP

(57) ABSTRACT

Advertisements are refreshed in an interface based on one or more parameters provided over a network. The parameters can be retrieved from a web service and implemented at a client device. Advertisement refreshing is performed independently of web page content loading. The parameters may include a time period and user action count and be configured differently for different markets, geographical areas, other customer groups, sections of an application or different advertisement types. One or more of the parameters may be adjusted at a back-end server and distributed to machines in the different customer groups, allowing an efficient and centralized mechanism for managing and updating advertisement refreshing.

20 Claims, 11 Drawing Sheets

ADVERTISEMENT REFRESH RULES FOR NETWORK APPLICATIONS

BACKGROUND

Description of the Related Art

Web-based advertising is an important source of revenue for companies that provide Internet services. In the past, graphical banners and other web-based advertisements are provided in web pages through which the web service is offered. The advertisements reach a targeted audience of web-using customers and provide income to the company providing the web page.

As users navigate through web pages comprising a web service, advertisements within the web pages are refreshed. Refreshing the advertisements from time to time allows multiple ads to be provided to a user over a period of time (thereby providing more income to the web service company) and prevents an advertisement from being displayed too long and becoming 'stale.' Typically, web-based advertisements are refreshed when a user navigates to a different web page which requires refreshing (or re-loading) a web page from a web server. For example, in a web-based mail service, advertisements may be refreshed when traversing between a web page displaying the user's inbox and a web page displaying the user's junk mail folder.

In current rich web applications, such as JavaScript-based web applications, more dynamic web page code is downloaded to the web browser (the client device) at the beginning of communication with a web server. After the initial download, much of the processing is done by the web browser (client application) itself so only smaller amounts of data need to be exchanged between the web browser (client application) and web server. Because more code is stored on the client device, the web pages of rich web applications do not need to be fully refreshed as often as web pages of non-rich web applications. In many cases, only parts of a rich web application web page are updated in response to user input. As a result, a user can spend more time on a single web page without having to refresh the page. As a result, previous web application advertisement refresh methods, which only refresh advertisements when the entire web page is refreshed, would result in advertisements being displayed for extremely periods of time because the web page is rarely refreshed. For example, a user may traditionally trigger several dozen web page refreshes when viewing a traditional HTML-based web site for ten minutes. If this web site were changed to a rich web site, viewing the same content might only trigger a couple of web page refreshes, thereby showing only a couple of advertisements during a ten-minute period. This limits the revenue received by web service companies from web advertising and may lead to the display of advertisements after they have become stale.

SUMMARY

The technology herein, roughly described, pertains to refreshing (or updating) advertisements in an interface provided over a network. Advertisements are refreshed based on one or more parameters. The parameters can be retrieved from a service (such as a web service or mobile device service) and implemented at the client device. Parameters can be implemented as conditions to be met before an advertisement is refreshed. Advertisement refreshing is performed independently of content loading in the interface. In one embodiment, the parameters may include but are not limited to a number of user actions and a period of time. The parameters may be configured differently for different markets, geographical areas, services, client applications, times of day or year, other customer groups, or other advertisement types. One or more of the parameters may be adjusted at a back-end server and distributed to client machines in the different customer groups, allowing an efficient and centralized mechanism for managing and updating effectiveness, costs, and other elements of advertisement refreshing.

In one embodiment, an advertisement may be refreshed after a minimum period of time and a minimum number of user actions have been detected. In some cases, both parameters are met before refreshing the advertisement. Accordingly, until both conditions (or parameters) are met, a particular advertisement associated with the parameters will not be refreshed.

Advertisement refreshment can be configured for several services, networks and customer groups in an efficient manner. For example, a configuration file having advertisement refresh parameters may be generated periodically. The configuration file may be accessed by several different services and networks. The systems may include a web-based mail service, a messaging service, a mobile device network, and other services and networks. Further, different parameters may be configured within each service or network. For example, advertisement refresh parameters may be configured for a web based mail service for different countries, in different languages, or for other types of customer groups.

This summary is provided to introduce a selection of concepts in a simplified form that are further described below in the description. This summary is not intended to identify key features or essential features of the claimed subject matter, nor is it intended to be used as an aid in determining the scope of the claimed subject matter

DETAILED DESCRIPTION

Figure 1A:
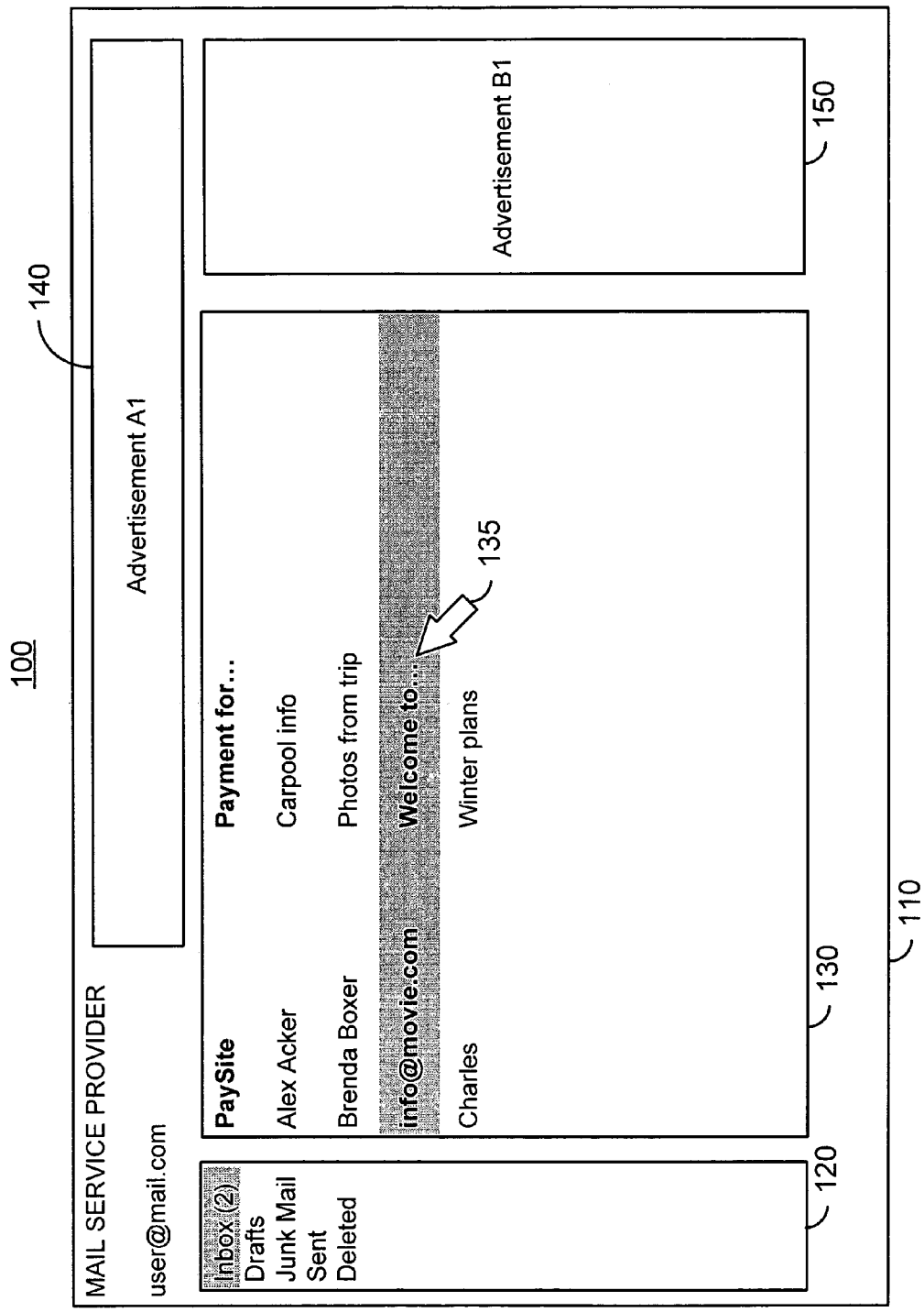
FIG. 1A illustrates an embodiment of an interface in which advertisements may be refreshed.

Advertisements within an interface are refreshed, or updated, based on conditions derived from one or more configurable parameters. Advertisement refreshing is performed independently of content loading within the interface. The parameters can be retrieved from a web service and implemented at the client device. The parameters may be configured differently for different markets, geographical areas, other customer groups, or different advertisement types. One or more of the parameters may be adjusted at a back-end server and distributed to machines in the different customer groups. This provides an efficient and centralized mechanism for managing and updating advertisement refreshing, as well as revenue maximization for each market based on user behavior and advertisement inventory. In some cases, the advertisements may be refreshed at the occurrence and/or detection of a user action within an interface of a service, thus preserving the user's experience within the service. The preserved user experience closely mimics traditional web sites where advertisements are refreshed when users click on parts of the web site that would cause the web site to reload.

In one embodiment, an advertisement may include a notice providing information regarding a product or service provided by a person (or persons), company, or some other entity. Content of an advertisement may include text, one or more images, video, animation, audio, a combination of these, or other media. The advertisement may comprise a portion of the content provided in a content page or web page interface. The interface providing the advertisement may be provided by a network browser application which provides the content page (such as an internet browser application) or an interface separate to that providing the content page (such as a separate browser application window).

In one embodiment, refreshing an advertisement within an interface may include replacing or otherwise updating the advertisement. For example, once a determination is made that an advertisement within an interface should be refreshed, a new advertisement can be positioned in place of the existing advertisement. In some embodiments, a new advertisement may be retrieved from an inventory of advertisements maintained by an advertisement service. When advertisements are refreshed, one or more advertisements may be placed in the position of the existing advertisement or one new advertisement may take the position of multiple existing advertisements. Advertisement replacement can be determined by the size of the advertisements and space available in the interface displaying them. Advertisement refreshing is discussed in more detail below.

In some embodiments, more than one parameter may be analyzed when determining when to refresh advertisements. For example, parameters may include a user action count, a time period, the advertisement type, the section of the web application the user is using, and/or other parameters. A user action count may be used as a minimum threshold. In this case, advertisements may not be refreshed until the current number of user actions detected meets the minimum threshold.

In one embodiment, a user action may be a request for a significant amount of web page content or some other significant web page event. Thus, not all user input may qualify as a user action. For example, in the case of actions within a mail service inbox interface, actions that may refresh an advertisement may include selecting a message from a message list, performing an action on a message (such as moving a message to a trash or junk folder), composing a message or a reply to a message, viewing or refreshing an inbox, selecting a folder, going to an additional screen of messages, or returning to the inbox from another section of the mail application interface. In another embodiment, the user action may be any action that requests a new page or completes a data entry process. In yet another embodiment, when a browser application is a rich client web application, an action may be detected as any action that would typically require a page reload in a similar, but non-rich web application. In other embodiments, other types of actions may qualify as a "user action."

A time period parameter may specify a minimum or maximum period of time, or a time range, at which an advertisement should be refreshed. For example, for a minimum time period parameter, the particular advertisement should not be refreshed until a period of time has passed that is at least as long as the minimum threshold time.

In some embodiments, multiple parameters may have to be satisfied in order to refresh an advertisement. For example, in the examples discussed above, an advertisement may not be refreshed until a minimum period of time has elapsed since the advertisement was last refreshed and a minimum number of user actions have been detected. If both of these conditions are met, then an interface advertisement may be refreshed. If any of the conditions are not met, then advertisement may not be refreshed.

In some embodiments, other conditions may need to be satisfied in addition to parameter related conditions. For example, assume an advertisement may only be refreshed at the occurrence of a detected user action. In this case, for an advertisement having parameters of a minimum user action count and minimum period of timer, if the minimum number of user actions is detected before the minimum period of time has elapsed, both conditions will have been met once the minimum period of time has elapsed. However, because the advertisement can only be refreshed at the detection of a user action, the advertisement will be refreshed at the detection of the first user action after the period of time has elapsed. Other non-parameter related conditions can be implemented as well, including not allowing advertisement refresh during text entry, which would be distracting to users.

Advertisement refresh rules may be generated and shared for different types of services and networks. For example, parameters may be configured for a web service, a web-based mail service, a messaging service, a mobile device service and other applications and services, including but not limited to internet-based applications. In addition, parameters may be configured for different business markets, different geographical areas, or other customer groups. Different sections of a single application or different advertisement types within a single application may have different parameters to determine when to refresh ads. As a result, advertisement refreshing may be provided over different types of networks, including the Internet and wireless device networks. These embodiments are discussed in more detail below.

FIG. 1A illustrates an embodiment of an interface 100 in which advertisements may be refreshed. Interface 100 illustrates a mailbox interface for viewing messages received within a web-based mail service. Interface 100 includes interface window 110, folder window 120, message list window 130, cursor 135 within message list window 130, advertisement A1 140 and advertisement B1 150. Folder window 120 lists folders associated with the user's web-based mail account. As illustrated, an "inbox" folder is highlighted within folder window 120. Message list window 130 lists the messages residing in the highlighted folder of folder window 120. As indicated, a message from info@movie.com is currently highlighted in message list window 130. Cursor 135 is currently positioned over the highlighted message in message list window 130.

Interface 100 includes advertisement A1 140 and advertisement B1 150. Advertisement A1 140 is located at the top of interface 100. Advertisement A1 140 can be implemented as one or more banner advertisements or some other type of advertisement. Advertisement B1 150 may be implemented as one or more advertisements on the right side of the interface. Though only two advertisements are illustrated in interface 100, additional advertisements can be used. Additionally, advertisements may be positioned in different locations than those illustrated in interface 100.

Figure 1B:
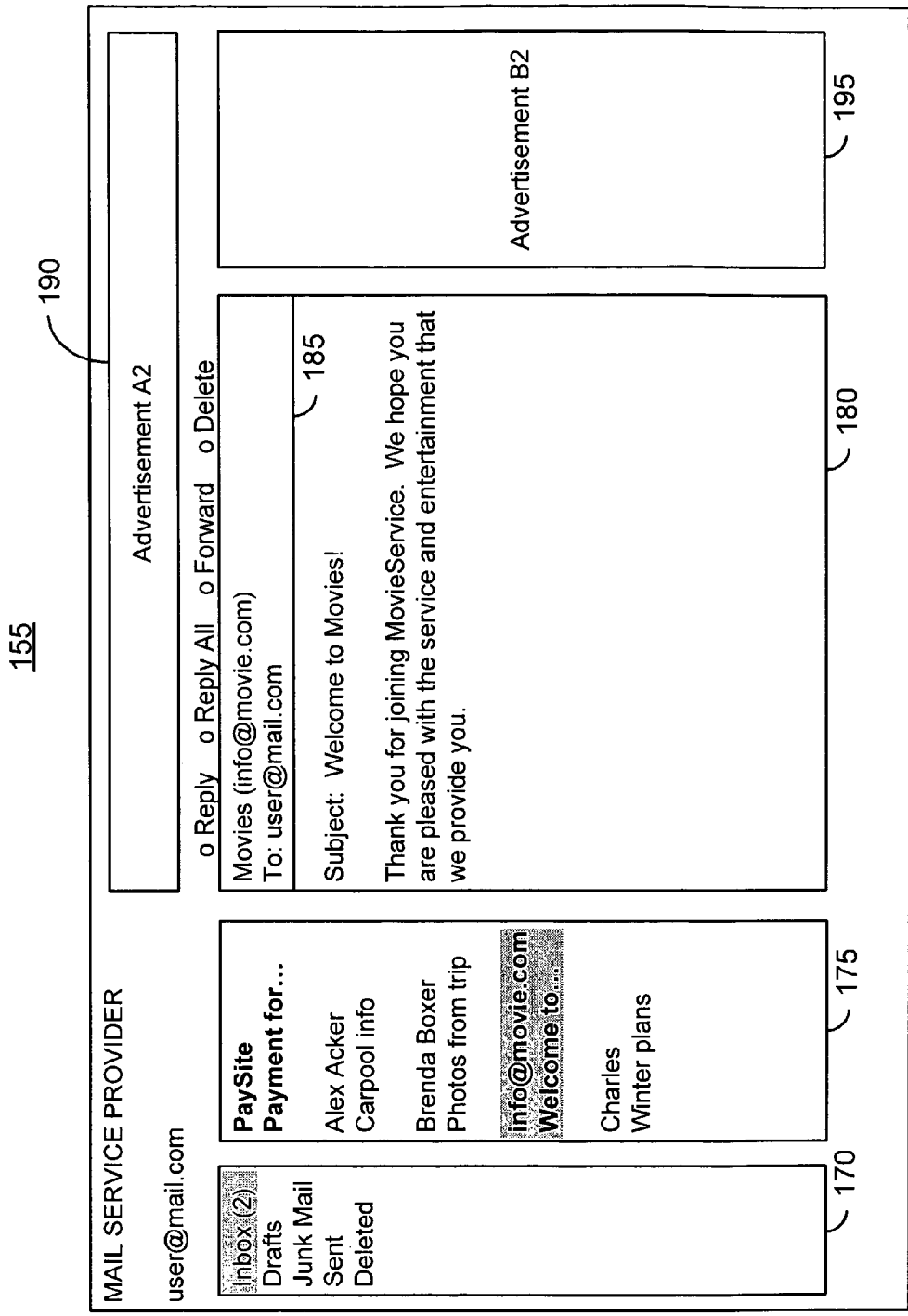
FIG. 1B illustrates an embodiment of an interface in which advertisements have been refreshed.

FIG. 1B illustrates an embodiment of an interface 155 in which advertisements have been refreshed. In one embodiment, interface 155 illustrates interface 100 of FIG. 1A after the highlighted message of message list window 130 has been selected. Unlike the displayed advertisements, the content page including the updated interface is not refreshed. Interface 155 of FIG. 1B includes interface window 160, folder window 170, message list window 175, message viewing window 180, refreshed advertisement A2 190 and refreshed advertisement B2 195. Folder window 170 and message list window 175 are similar to folder window 120 and message list window 130 of FIG. 1A, respectively. Message viewing window 180 provides the content of a selected message within message list window 175. Message viewing window 180 includes a mail header 185. Mail header 185 includes the sender and recipient of the message within message viewing window 180.

Refreshed advertisement A2 190 is a different advertisement than advertisement A1 140 of FIG. 1A. Similarly, refreshed advertisement B2 195 is a different advertisement than advertisement B1 150 of FIG. 1A. Advertisement A2 190 and advertisement B2 195 of FIG. 1B are loaded once a determination is made to refresh advertisements A1 140 and B1 150 of FIG. 1A. Methods for determining when to refresh advertisements within an interface are discussed in more detail below.

Figure 2A:
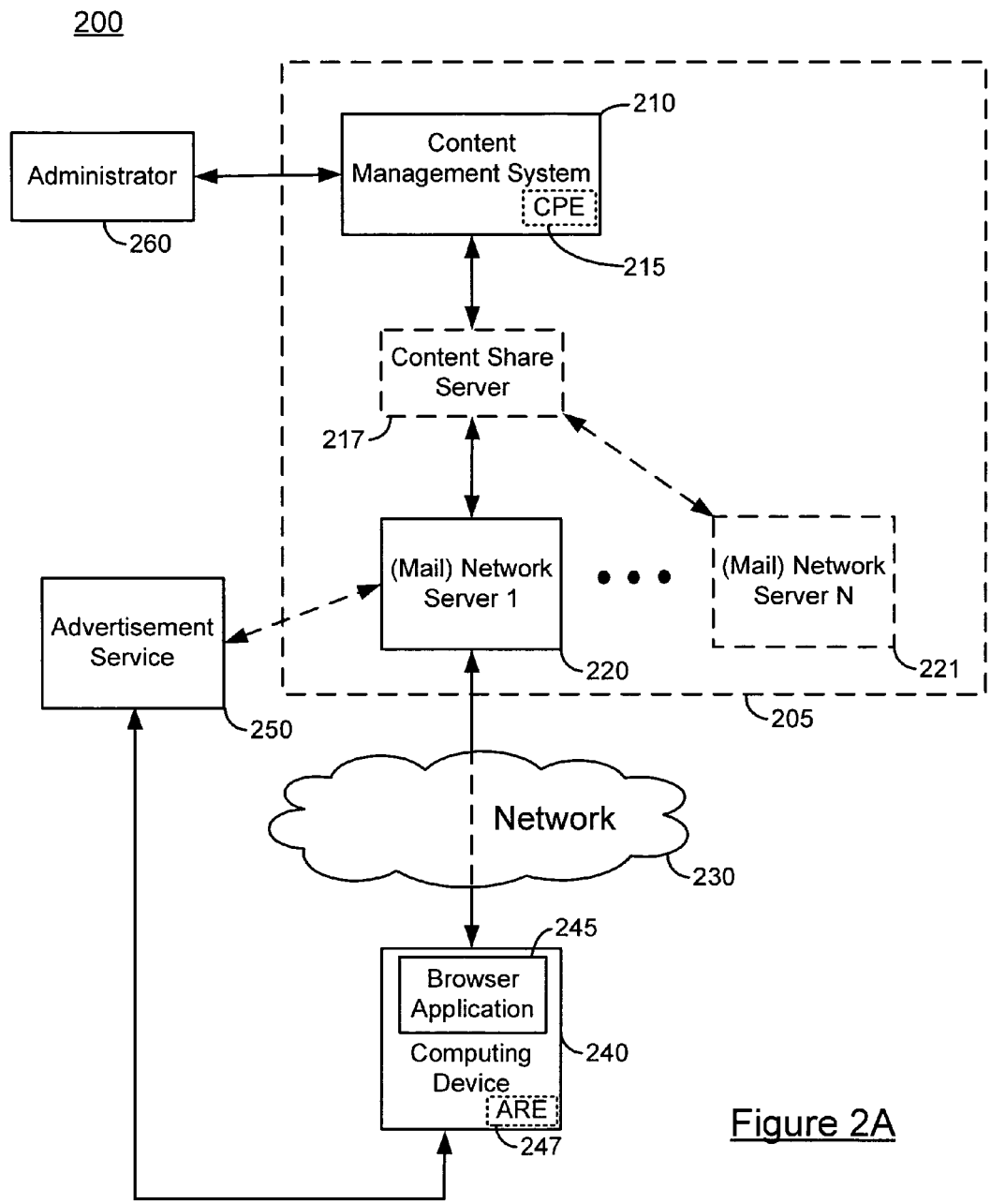
FIG. 2A illustrates an embodiment of a system for refreshing advertisements provided through a web service.

FIG. 2A illustrates an embodiment of a system 200 for refreshing advertisements provided through a network. System 200 includes network service system 205, administrator 260, advertisement service 250, network 230 and computing device 240. Network service system 205 includes content management system 210, content share server 217, network server 220 and network server 221.

In one embodiment, network 230 can be the Internet. In this embodiment, network servers 220-221 can be implemented as web servers. Further, network service system 205 may provide a web service. In particular, network service system 205 may provide a web-based mail service. The discussion below may refer to the embodiment wherein servers 220-221 are implemented as web servers and system 205 provides a web-based mail service. This refers to one embodiment of the system of FIG. 2A, and is not intended to limit the scope of system 205 of FIG. 2A to a web based mail service or any other type of service over the Internet or other network.

Content management system 210 may send and receive information with administrator 260 and content share server 217. Additionally, content management system 210 generates a content management file. The content management file may contain advertisement refresh parameters. In one embodiment, the content management file is an XML file. Content management system 210 may also include a content processing engine (CPE) 215. In one embodiment, CPE 215 may generate the actual content management file, including the refresh parameters. In one embodiment, the content management file may be generated in response to user input (for example, input from administrator 260) or data received from another machine (not illustrated in FIG. 2A). Content file generation is discussed in more detail below. After generation, the content file can be transmitted to different servers within system 205, including servers 220-221 or content share server 217.

Content share server 217 is optional in network service system 205. When implemented, content share server 217 may send and receive information with content management system 210 and network servers 220-221. In particular, content share server 217 is able to provide content responses to requests from other servers. In one embodiment, content share server 217 may receive a content management file from content management system 210. The content management file may then be provided to requesting servers, such as network servers 220-221. In systems not utilizing content share server 217, web servers may access the content management file directly from content management system 210.

Administrator 260 represents a user or group of users that may provide input or other information to content management system 210. In particular, administrator 260 may provide input indicating advertisement refresh parameters to be applied to different customer groups. The different customer groups may be associated with geographical area, language, business markets or some other grouping.

One or more network servers may be included within network service system 205. Network servers 220-221 may transmit and receive messages from content share server 217 (optional) content management server 210 (connection not illustrated in FIG. 2A), advertisement service 250, and computing device 240. As illustrated in FIG. 2A, network servers may include network server 220 and include a number of network servers N up to network server 221. The servers are use to provide web service content to a browser application on one or more client devices. In one embodiment, the web servers may provide content as well as a content management file to client devices. Operation of network servers 220-221 is discussed in more detail below.

Advertisement service 250 provides advertisements to requesting entities. The entities may be a browser, web server, client device or some other computing device. For example, web servers 220-221 of network service system 205 may access advertisements from advertisement service 250. In another embodiment, computing device 240, or browser application 245 of computing device 240, may access advertisement service 250 in order to refresh advertisements displayed for a user through browser application 245. This is discussed in more detail below.

Computing device 240 may send and receive messages with network servers 220-221 and advertisement service 250. Computing device 240 may include a browser application 245 and an advertisement refresh engine (ARE) 247. In one embodiment, when a computing device determines that advertisements should be refreshed, ARE 247 directly retrieves an advertisement from advertisement service 250 and refreshes the advertisement within the appropriate interface. Computing device 240 may be implemented using computing environment 200 of FIG. 2. This is discussed in more detail below.

The implementation of ARE 247 in computing device 240 is optional. Browser application 245 may include ARE 247, or ARE 247 may be implemented separately. Computing device may receive ARE 247 as part of browser application 245 or separately from a server in which advertisement refreshing rules are directly or indirectly received. ARE 247 retrieves and refreshes advertisements in an interface provided by browser application 245.

In addition to a server client system sharing information over a network (such as a web-based email service over the Internet), the technology herein can be implemented in several other applications and networks. Some representative examples of these alternative embodiments are discussed below with respect to FIGS. 2B-2D.

Figure 2B:
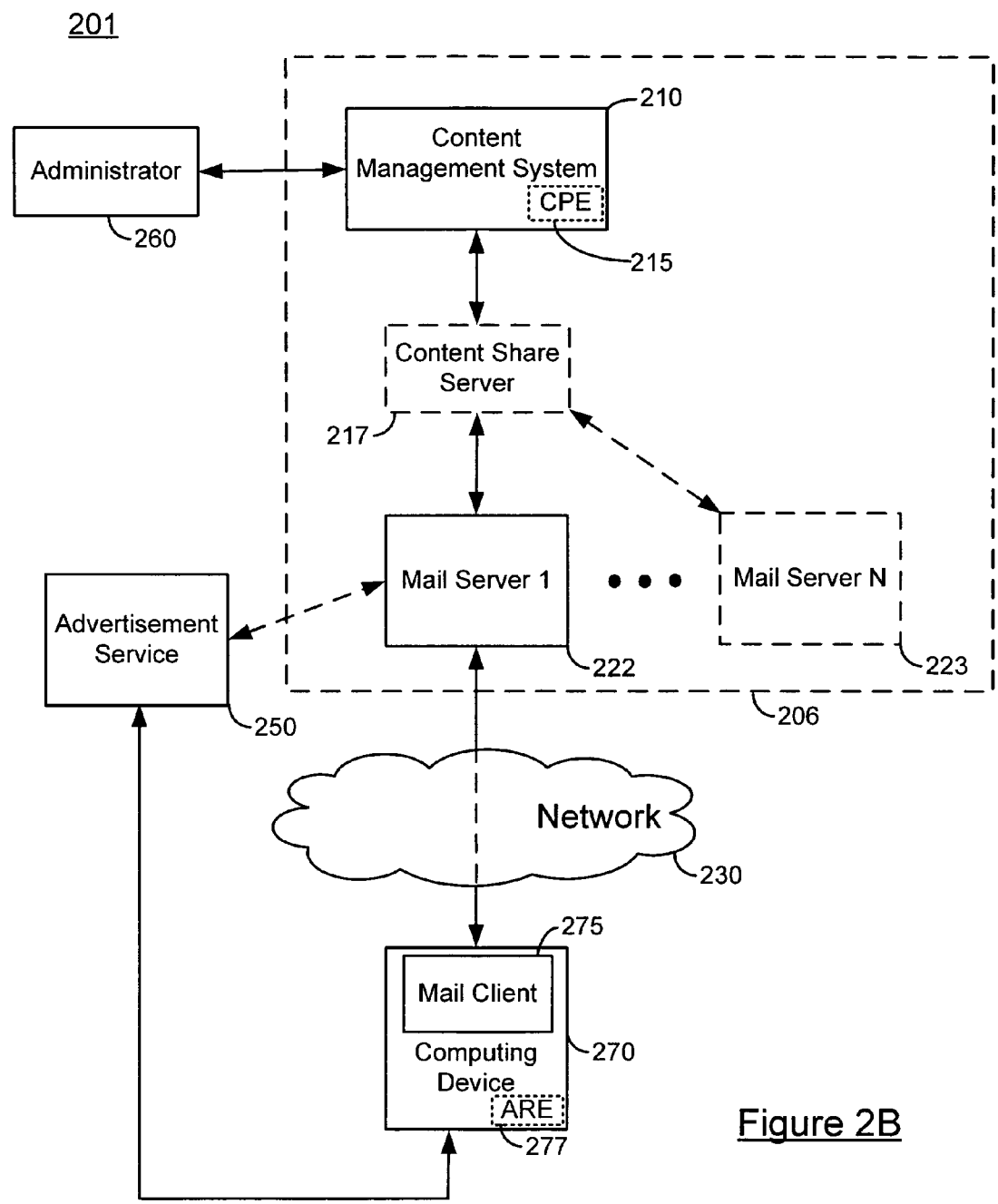
FIG. 2B illustrates an embodiment of a system for refreshing advertisements provided through a client-based mail service.

FIG. 2B illustrates an embodiment of a system 201 for refreshing advertisements provided through a client-based mail service. System 201 includes mail service system 206, administrator 260, network 230, advertisement service 250, and computing device 270. Mail service system 206 includes content management server 210, content share server 217, mail server 222 and mail server 223. Administrator 260, network 230, and advertisement service 250 of FIG. 2B are the same as those illustrated by FIG. 2A and discussed above. Content management system 210 and content share server 217 of mail service system 206 are similar to those of network service system 205 of FIG. 2A.

Mail servers 222-223 may send and receive messages with content share server 217, content management system 210, advertisement service 250, and computing device 270. Servers 222-223 are used to provide mail service to a stand-alone mail client 275 of computing device 270. In particular, mail servers 222-223 may store and mange stored messages for mail client 275. Any number of mail servers 222-223 can be implemented, although only two mail servers are illustrated in FIG. 2B.

Computing device 270 is used to implement a stand-alone mail client 275. In one embodiment, mail client 275 may be implemented using "OUTLOOK" mail client software, of Microsoft Corporation of Redmond, Wash. Computing device 270 may be implemented using computer environment 200 of FIG. 3 discussed in more detail below.

In operation, a client-based mail service is provided at computing device 270 through mail client 275. A content management file which includes advertisement refresh parameters is generated by CPE 215 of content management system 210. The content management file is then provided to either content share server 217 or mail servers 222-223. If implemented, content share server provides the content management file to mail server 222. Computing device 270 receives the content management file from server 222. Advertisements are initially displayed and occasionally refreshed in an interface provided by mail client 275. The advertisements are displayed and refreshed according to the content management file. Refreshing of advertisements is discussed in more detail below with respect to FIGS. 4A-7B.

Figure 2C:
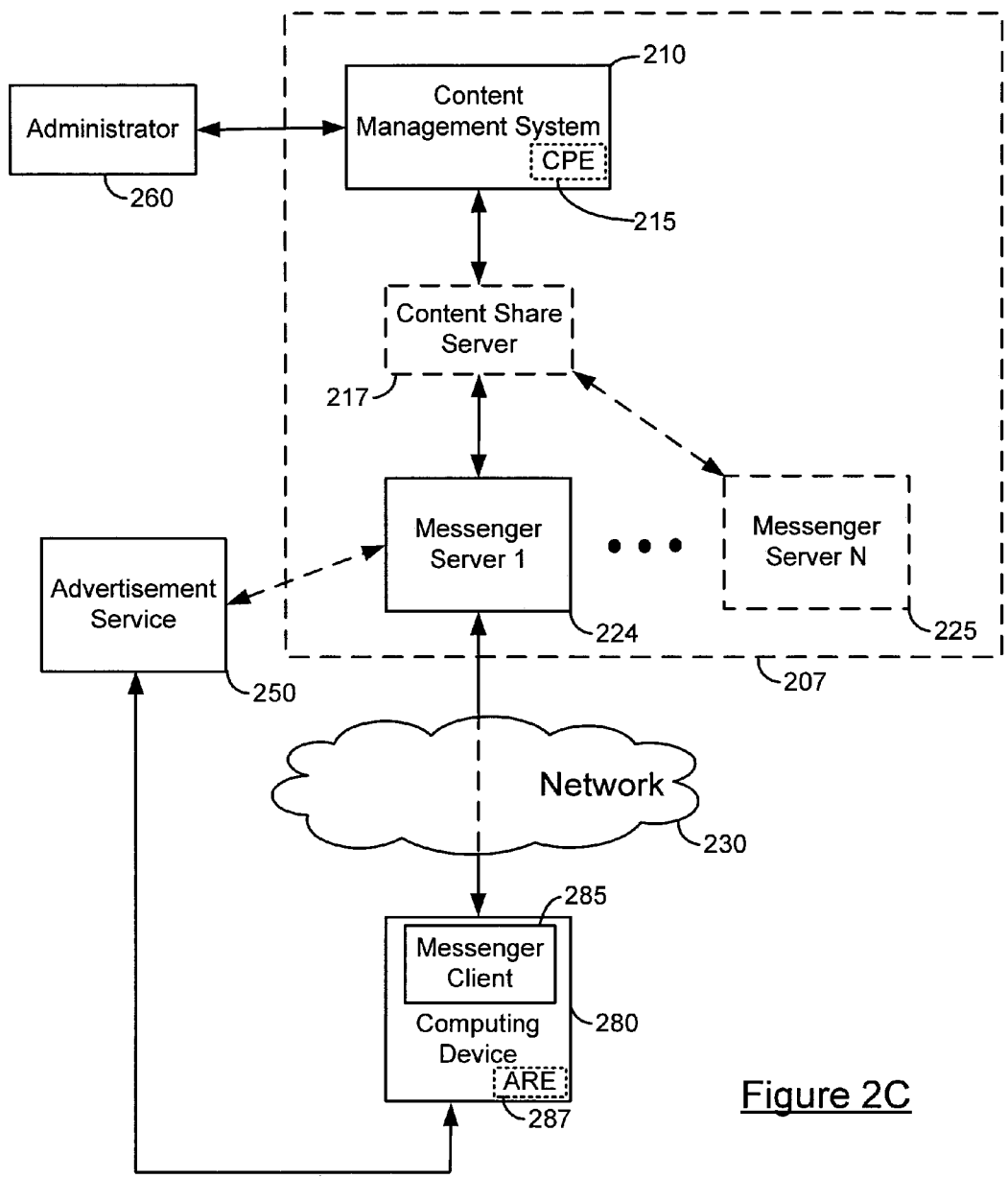
FIG. 2C illustrates an embodiment of a system for refreshing advertisements provided through a messaging service.

FIG. 2C illustrates an embodiment of a system 202 for refreshing advertisements provided through a messaging service. System 202 includes messaging service system 207, network 230, advertisement service 250, administrator 260, and computing device 280. Messaging service system 207 includes content management system 215, content share server 217, messaging server 224 and messaging server 225. Administrator 260, advertisement service 250, and network 230 are the same as those of FIG. 2A discussed above. Messaging service system 207 includes the same content management system 210 and content share server 217 as that of network service system 205 of FIG. 2A.

Messaging servers may send and receive messages with messaging servers 224-225, content share server 217, content management system 210, advertisement service 250, and computing device 280. Messaging servers 224-225 are used to manage a messaging service between client devices and web service system 207. Any number of messaging servers may be used, although only two are illustrated. Computing device 280 is in communication with messaging server 224 over network 230. Computing device 280 includes messaging client application 285 and ARE 287. Messaging client 285 may be implemented with "MESSENGER," of Microsoft Corporation, of Redmond, Wash. Computing device 280 may be implemented using computing environment 300 of FIG. 3 discussed in more detail below.

In operation, a messaging service is provided at computing device 280 through messaging client 285. A content management file which includes advertisement refresh parameters is generated by CPE 215 of content management system 210 and provided to either content share server 217 or messaging servers 224-225. If implemented, content share server provides the content management file to messaging server 224. Computing device 280 receives the content management file from server 224. Advertisements are initially displayed and occasionally refreshed in an interface provided by messaging client 285. The advertisements are displayed and refreshed according to the content management file. Refreshing of advertisements is discussed in more detail below with respect to FIGS. 4A-7B.

Figure 2D:
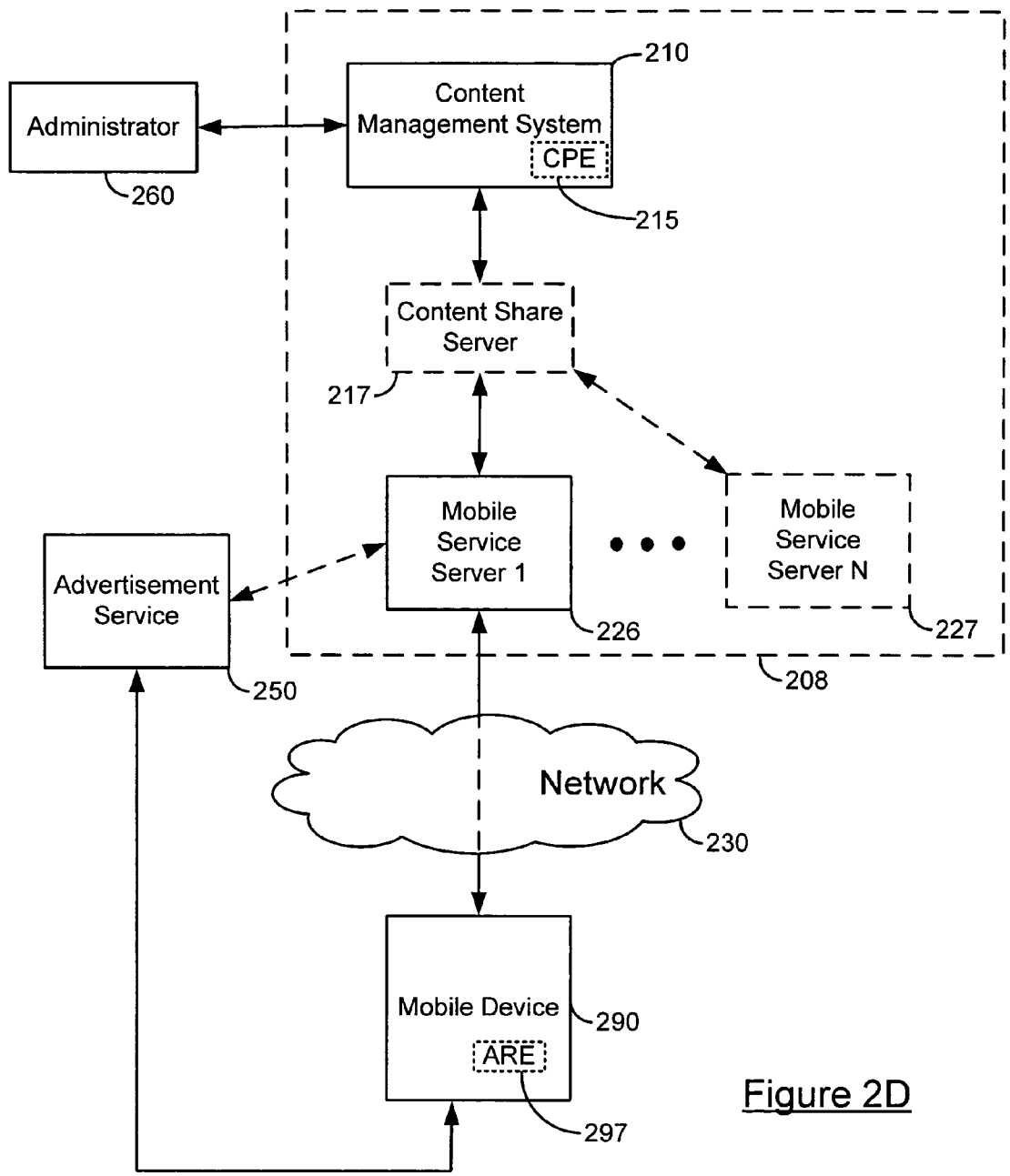
FIG. 2D illustrates an embodiment of a system for refreshing advertisements provided through a mobile device service.

FIG. 2D illustrates an embodiment of a system 203 for refreshing advertisements provided through a mobile device service. System 203 includes mobile service system 208, network 230, advertisement service 250, administrator 260, and mobile device 290. Mobile service system 208 includes content management system 210, content share server 217, mobile service server 216 and mobile service server 217. Administrator 260, advertisement service 250, and network 230 are the same as those of system 205 of FIG. 2A. Content management system 210 and content share server 217 of mobile service system 208 are the same as those discussed above with reference to system 205 of FIG. 2A.

Mobile service server 226 may send and receive messages from content share server 217, content management system 215, advertisement service 250, and mobile device 297. Mobile service servers 226-227 are used to transmit and receive information with a mobile device. Mobile device 290 includes ARE 297 for retrieving and displaying advertisements in the display of mobile device 290. Mobile device 290 may be implemented as any number of mobile devices, including but not limited to a laptop computer, a notebook computer, a cellular phone, a personal digital assistant (PDA), camera, or other wireless device. Mobile device 290 may send and receive information with advertisement service 250. In particular, ARE 297 of mobile device 290 may retrieve an advertisement from advertisement service 250 when advertisements are to be refreshed within mobile device 290. This is discussed in more detail below.

Figure 3:
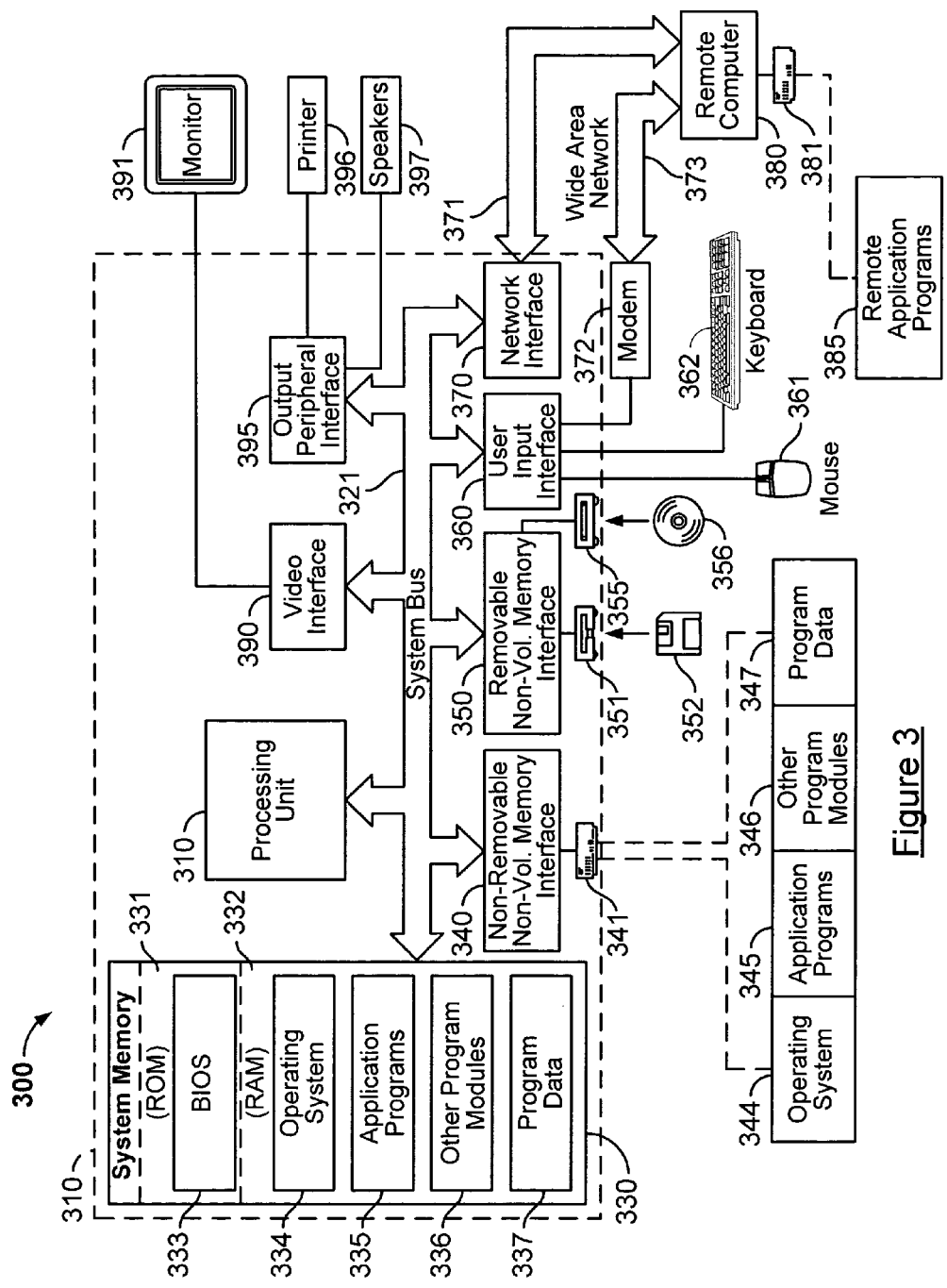
FIG. 3 illustrates an embodiment of a computing environment for implementing computing devices in the technology herein.

FIG. 3 illustrates an embodiment of a computing environment 300 that can utilize the technology described herein. In one embodiment, computing environment 300 may be used to implement computing device 240 of FIG. 2A, computing device 270 of FIG. 2B, computing device 280 of FIG. 2C and computing device 290 of FIG. 1D. A computing environment similar to computing environment 300 may be used to implement a server, though not all illustrated elements of environment 300 are required. In particular, computing environment 300 may be used to implement content share server 217, content management system 210, advertisement service 250, and network servers 220-221 of FIG. 2A, mail servers 222-223 of FIG. 2B, messaging servers 224-225 of FIG. 2C and mobile service servers 226-227 of FIG. 1D Computing environment 300 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, etc. that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the technology herein includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through a output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4:
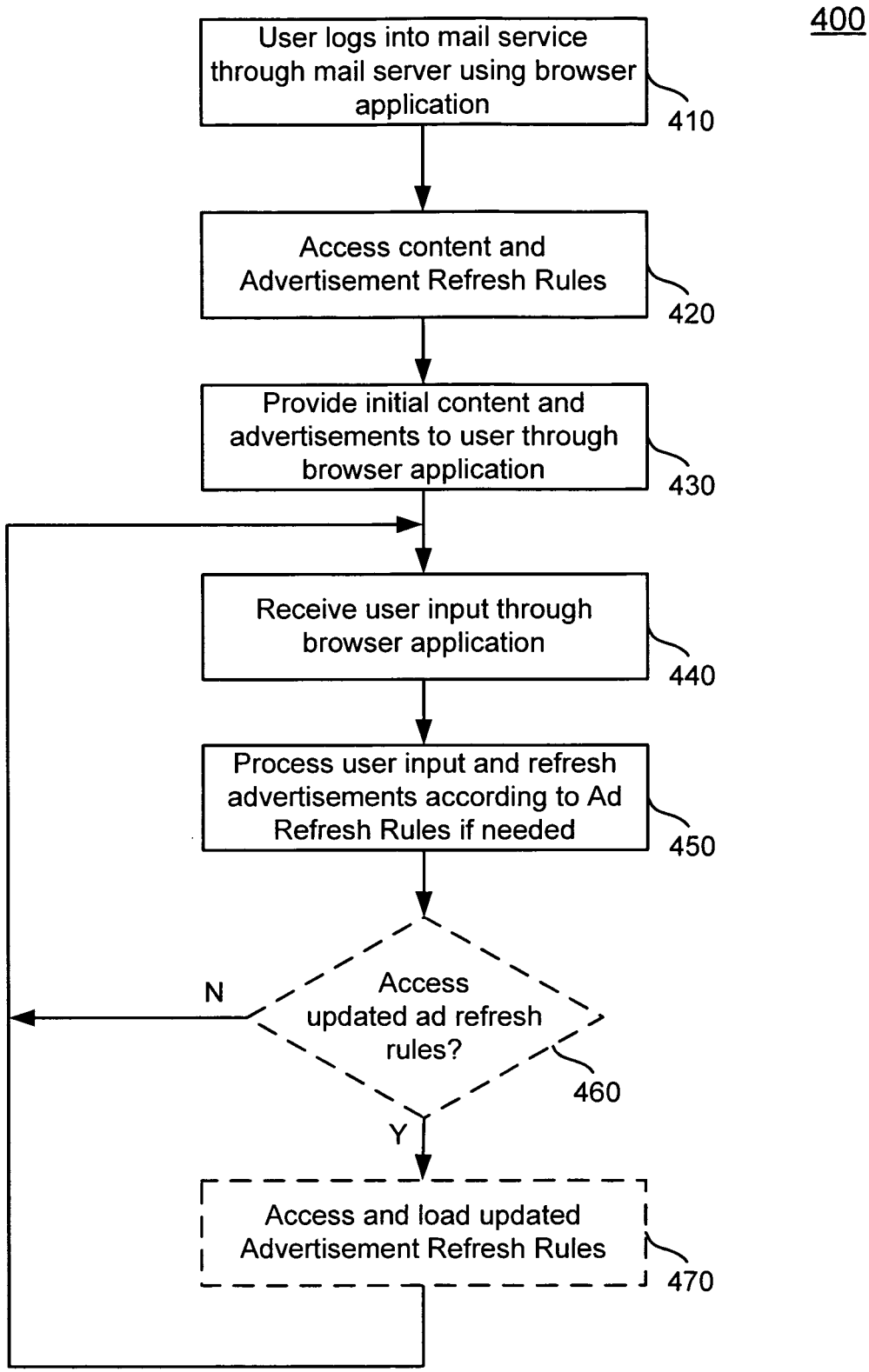
FIG. 4 illustrates an embodiment of a method for refreshing advertisements in a service provided over a network.
Figure 5:
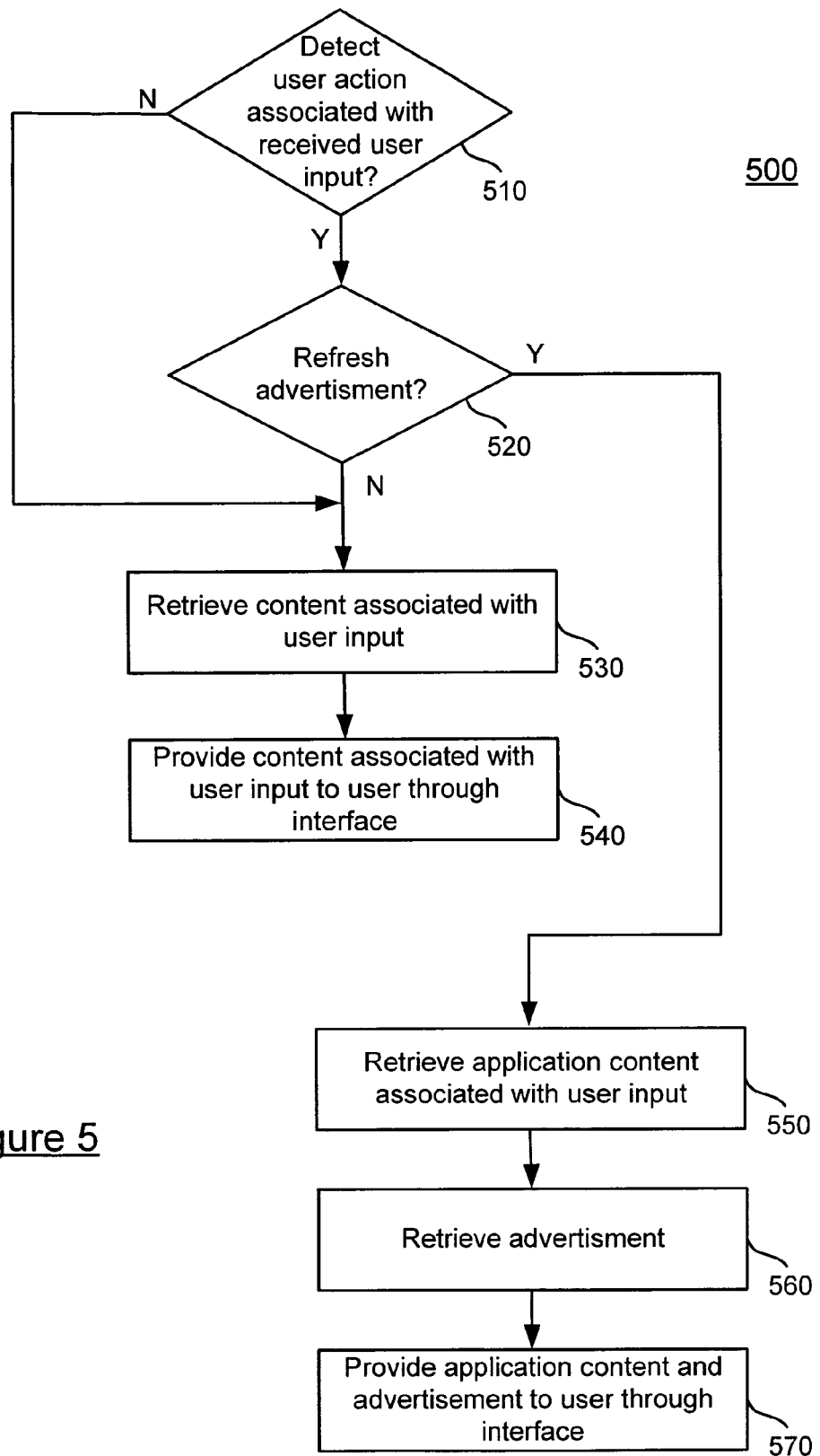
FIG. 5 illustrates an embodiment of a method for processing user input and refreshing advertisements.
Figure 6:
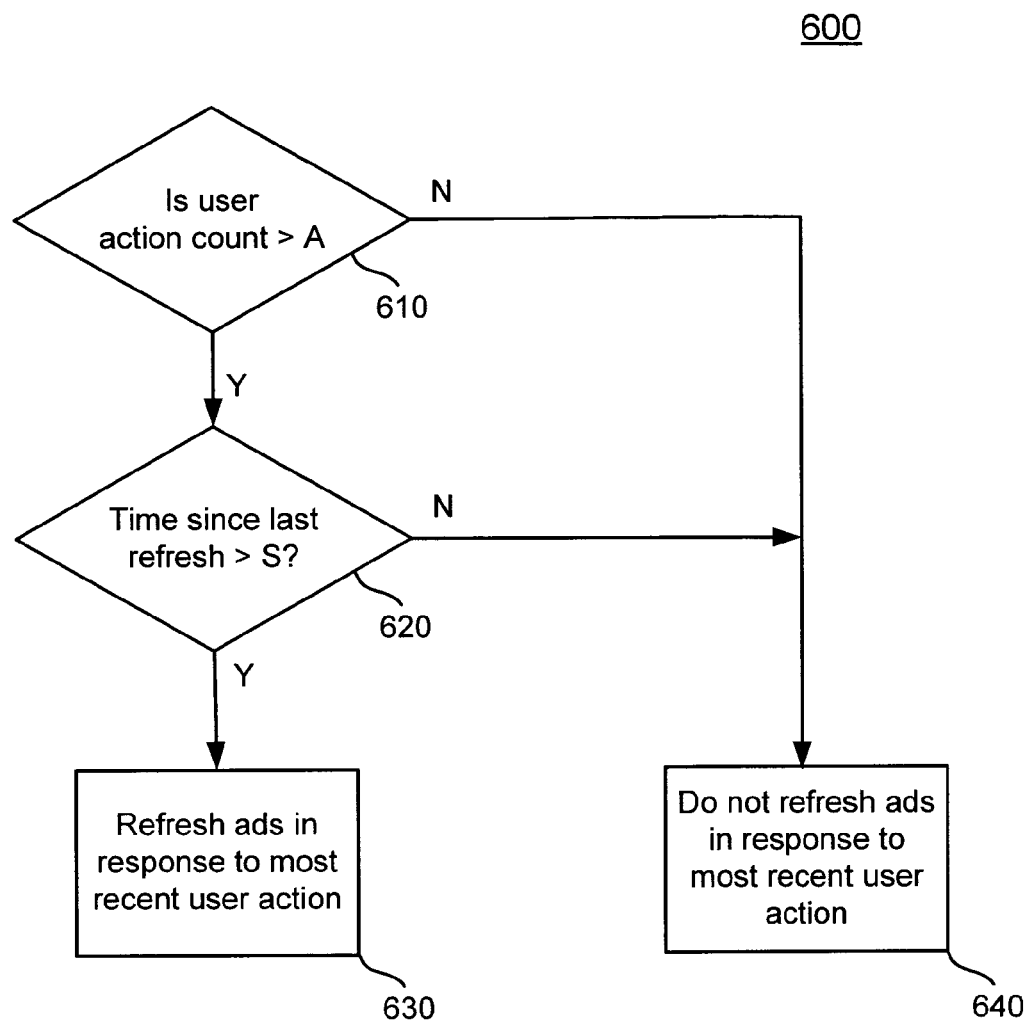
FIG. 6 illustrates an embodiment of a method for determining whether an advertisement should be refreshed.

FIGS. 4-6 include flow charts that illustrate various embodiments for refreshing advertisements in a network environment. The embodiments discussed with respect to FIGS. 4-6 relate to a web-based mail service, such as that illustrated in an embodiment of system 200 of FIG. 2A. The methods described in these figures can be applied to other systems and networks, including but not limited to the systems of FIGS. 2B-2D. A web-based mail service is discussed with reference to FIGS. 4-6 for purposes of illustration only.

FIG. 4 illustrates an embodiment of a method 400 for refreshing advertisements in a network browser application in a service provided over a network. Method 400 begins when a user logs into a web-based mail service through a mail web server 220 using browser application 245 at step 410. Next, content and advertisement refresh rules are accessed by browser application 245 at step 420.

Advertisement refresh rules can be accessed by browser application in several ways. In one embodiment, the browser application may request the advertisement refresh rules from a server, such as mail web server 220. In one embodiment, if computing device 240 makes a query to mail web server 220 for the existence of new refresh rules (or a new content management file), web server 220 will send a response to computing device 240 with a time stamp associated with the most recent advertisement refresh rules. Computing device 240 will then compare the received time stamp to a timestamp associated with the advertisement refresh rules currently used by computing device 240. If the advertisement refresh rule time stamps do not match, computing device 240 will retrieve the most recent advertisement refresh rules from web server 220.

In another embodiment, web server 220 may automatically provide the most recent advertisement refresh rules to computing device 240. This may be performed at any of several times during a user session, such as the beginning of a user session with the mail service, at user session authentication, at some regular interval, or at the occurrence of some other event.

Returning to method 400, initial web page content and advertisements are then provided to the user through browser application 245 at step 430. The advertisements may be provided to browser application 245 by ARE 247. In on embodiment, ARE 247 retrieves the advertisements from advertisement service 250. Next, user input is received through browser application 245. In one embodiment, the input may be a selection of an interface button, link or other element, entry of text, or a request for a different web page. User input is processed and the advertisements are refreshed, if needed, according to advertising refresh rules at step 450. In one embodiment, web page content may be changed or added at step 450 to the interface provided by browser application 245. Additionally, advertisements may be refreshed, if needed. Step 450 is discussed in more detail below with respect to method 500 of FIG. 5.

In some embodiments (as that illustrated in FIG. 4), steps 460 and 470 of method 400 are optional. In this case, the steps are not performed on a regular basis. When step 460 and 470 are not implemented, operation returns to step 440 from step 450. When steps 460 and 470 are implemented, a determination is made as to whether updated advertisement refresh rules are to be accessed at step 460. Access of a rule may be performed by proactive retrieval of the rules by computing device 240 or proactive transmittal of the rules by web server 220. In the latter case, web server 220 may transmit the rules to computing device 240 on its own initiative. This is discussed in more detail below with respect to FIG. 7A-7B. Proactive retrieval of the advertisement refresh rules is discussed above with respect to step 420. Next, updated advertisement refresh rules are accessed and loaded at step 470. In one embodiment, a user may be forced to re-authenticate after a period of time, for example, every 24 hours. In this case, the updated advertisement refresh rules are received at the time of user authentication. In another embodiment, advertising refresh rules may be accessed and loaded at some other time.

FIG. 5 illustrates an embodiment of a method 500 for processing user input and refreshing advertisements. In one embodiment, method 500 provides more detail of step 450 of method 400 of FIG. 4. First, a determination is made as to whether a user action is detected from received user input at step 510. A user action may be a request for a significant level of web page content or some significant event within a web page and initiated by a user. Types of user input detected to be a user action are discussed in more detail above. If a user action is detected at step 510, operation continues to step 520. If a user action is not detected at step 510, operation continues to step 530.

At step 520, a determination is made as to whether the advertisement should be refreshed. In one embodiment, an advertisement may be refreshed if conditions associated with certain parameters are met. For example, refresh parameters may include a time parameter and a user action count parameter. In this case, a minimum time must transpire and a number of user actions must be detected since the last time advertisements in the interface were refreshed. In one embodiment, different advertisements within an interface may be associated with different parameters. Thus, a first advertisement within an interface may be refreshed once five user actions are detected, while a second advertisement may be refreshed upon detecting seven user actions. This is discussed in more detail with respect to method 600 of FIG. 6 below. If the advertisement is to be refreshed, operation continues to step 550. If the advertisement is not to be refreshed, operation continues to step 530.

At step 530, a determination has been made that the advertisement is not to be refreshed. In one embodiment, either the input detected was not a user action or a determination was made not to refresh the advertisement upon the current user action detected. Content associated with user input is retrieved at step 530. Next, the content associated with the user input is provided to the user through the interface at step 540. Operation then ends at step 540.

At step 550, a determination has been made that the advertisement should be refreshed. Application content associated with user input is retrieved at step 550. In one embodiment, application content associated with user input is retrieved from mail server 220 by browser application 245. An advertisement is then retrieved at step 560. With respect to system 200 of FIG. 2A, the advertisement may be retrieved from advertisement service 250 by web server 220 or ARE 241 of computing device 240. Application content and the advertisement are provided to the user through the interface of browser application 245 at step 570. In one embodiment, the advertisement is provided to browser application 245 by ARE 247 of FIG. 2A.

FIG. 6 illustrates an embodiment of a method 600 for determining whether an advertisement should be refreshed. In one embodiment, method 600 of FIG. 6 provides more detail of step 520 of method 500 in FIG. 5. First, a determination is made as to whether the user action count is greater than a threshold (for example, an action count threshold A) at step 610. In this case, the determination includes whether the current number of detected user actions, including the most recent action detected at step 510 of method 500, meets or exceeds the threshold count. The count is associated with parameters received from content share server 217 or content management system 210. If the current user action count is determined to be equal or greater than the threshold, operation continues to step 620. If the user action count detected is not greater than the action count threshold, operation continues to step 640.

A determination is made at step 620 as to whether the time elapsed since the last advertisement refresh is greater than a time threshold S. The time threshold may be associated with a parameter received from content share server 217 or content management system 210. If the time since the last refresh has exceeded the time threshold, then operation continues to step 630. If the time since the last advertisement refresh has not exceeded the time threshold, operation continues to step 640.

At step 640, a determination is made that a condition associated with one of the parameters has not been met. As a result, advertisements will not be refreshed in response to the most recent user action and operation of method 600 ends. At step 630, a determination has been made that the conditions associated with the parameters of the content management file have been met for at least one advertisement. The particular advertisement is then refreshed in response to the most recent user action. Operation of method 600 then ends at step 630.

Figure 7A:
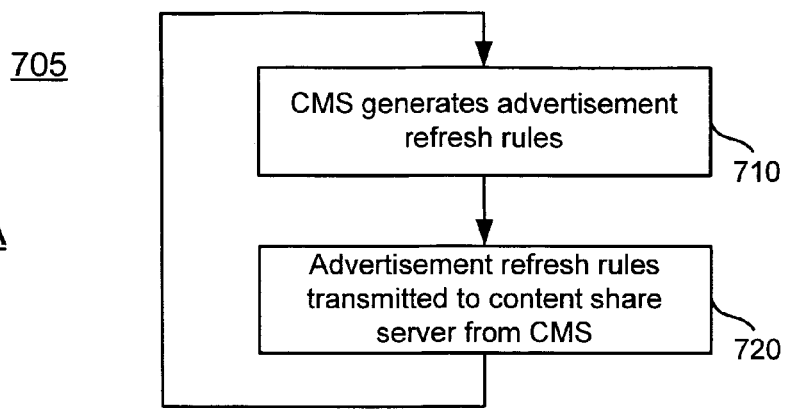
FIG. 7A illustrates an embodiment of a method for generating advertisement refresh rules.

FIG. 7A illustrates an embodiment of a method 705 for generating advertisement refresh rules. In one embodiment, method 705 is implemented by content management system 210. First, content management system 210 generates advertisement refresh rules at step 710. The advertisement refresh rules may be generated in response to input received from administrator 260 or some other source. Generation of the rules may include writing or updating a set of advertisement refresh parameters for one or more customer groups. In one embodiment, generation of the advertisement refresh rules includes generation of a content management file that includes the rules. The content management rules may be generated by CPE 215 or content management system 210. The rules can be generated periodically, for example every four hours, based on input received that affects the rules, or based on some other event.

Next, in an embodiment incorporating a content share server, advertisement refresh rules are transmitted to content share server 217 from content management system 210 at step 720. The advertisement refresh rules are transmitted in response to generation of the rules by content management system 210. Operation of method 705 then returns to step 710. The process of generating the advertisement refresh rules and providing the rules to content share server 217 is repeated within method 705. In an embodiment that does not incorporate content share server 217, content management system 210 may transmit the advertisement rules to one or more web servers or retain the rules until they are requested.

Figure 7B:
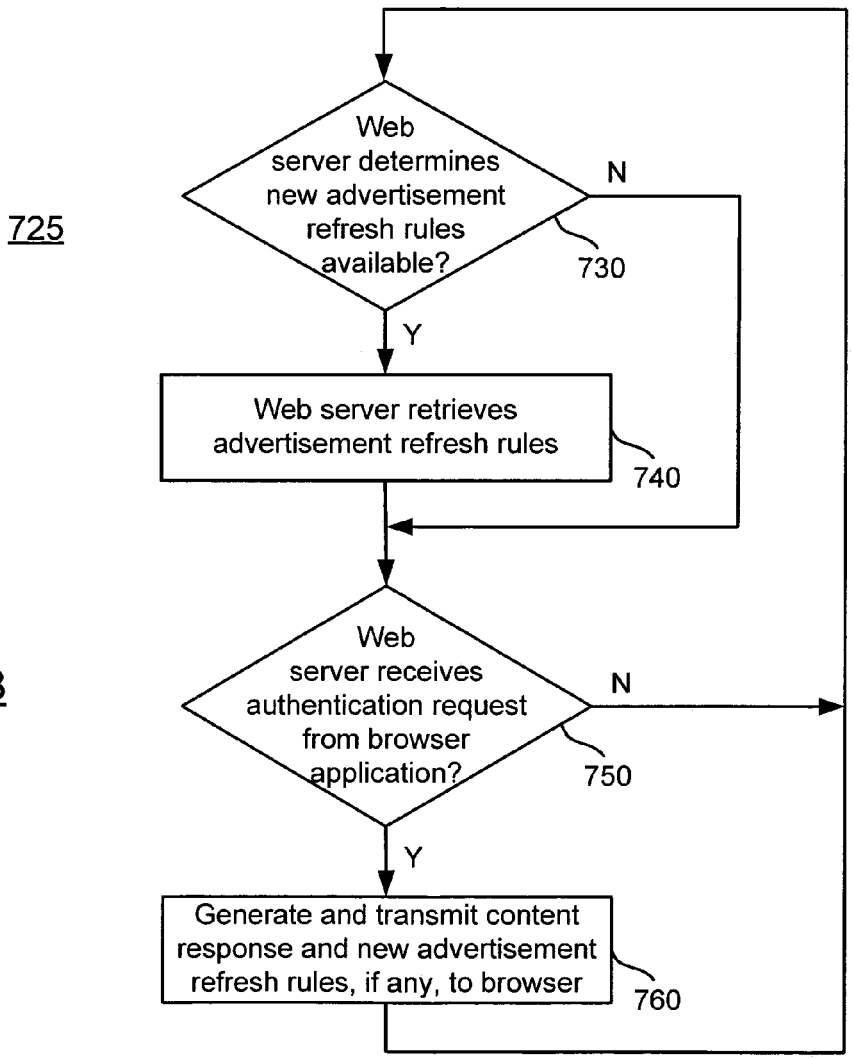
FIG. 7B illustrates an embodiment of a method for providing advertisement refresh rules.

FIG. 7B illustrates an embodiment of a method 725 for providing advertisement refresh rules to a network browser. Method 725 is implemented simultaneously or sequentially with method 705 of FIG. 7A. Web server 220 makes a determination as to whether new advertisement refresh rules are available at step 730. As mentioned earlier, the advertisement refresh rules may be contained as parameters within a content management file. In one embodiment, web server 220 makes the determination after being notified by content management system 210 or content share server 217 that new refresh rules are available. In another embodiment, web server 220 can periodically query content share server 217 or content management system 210 for the existence of a new set of advertisement refresh rules. In this case, in response to the query, content management system 210 or content share server 217 may send a response to web server with time-stamp information associated with the most recent set of advertisement refresh rules.

If web server 220 determines that the time stamp of the most recent rules does not match the most recent advertisement refresh rules maintained by web server 220, web server 220 will request a copy of the more recent advertisement refresh rules from the appropriate server. If web server 220 determines a new set of advertisement refresh rules is available, operation continues to step 740. If a determination is made that a new set of advertisement refresh rules is not available, operation continues to step 750. At step 740, web server 220 retrieves the more recent advertisement refresh rules from the appropriate server, such as content management system 210 or content share server 217. Operation then continues from step 740 to step 750.

At step 750, a determination is made as to whether the most recent advertisement refresh rules should be transmitted to browser application 245. As discussed above, the most recent advertisement refresh rules can be transmitted in several ways. The rules can be transmitted as they become available to web server 220, upon request by browser application 245, or in response to some other event. In one embodiment, the event can be a user authentication within the network service provided. In this case, updated advertisement refresh rules, if any, can be provided at the time of user authentication. In some cases, a user can be required to re-authenticate periodically, for example every twenty-four hours. In this case, advertisement refresh rules are transmitted to browser application 245 at least every twenty-four hours (for example, when a user re-authenticates). In FIG. 7B, an embodiment relating to transmitting advertisement refresh rules at user authentication is illustrated, and discussed below.

A determination is made at step 750 as to whether web server 220 receives an authentication request from browser application 245 at step 750. If a determination is made that the web server has not received an authentication request from browser application 750, operation returns to step 730. If a determination is made that an authentication request is received by web server 220 at step 750, operation continues to step 760. At step 760, a content response is generated and transmitted from web service 220 to browser application 245, along with any new advertisement refresh rules. After generating and transmitting the content response and new advertisement refresh rules, operation method 725 returns to step 730.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for providing content to a user through a user interface, comprising:
   displaying content and an advertisement in the user interface;
   receiving a plurality of user inputs from a single user through the user interface, including receiving a selected portion of the content displayed in the user interface from the user;
   determining which of the plurality of user inputs qualify as one or more user actions;
   determining whether a number of user actions received from the single user through the user interface since the advertisement was initially displayed in the user interface exceeds a user action count threshold, wherein the user action count threshold designates a minimum number of user actions that must be received after the advertisement is initially displayed in the user interface before the advertisement may be refreshed;
   determining whether a period of time that has elapsed between the time the advertisement was initially displayed in the user interface and the number of user actions was received exceeds a minimum period of time, wherein the minimum period of time designates an amount of time that must elapse after the advertisement is initially displayed in the user interface before the advertisement may be refreshed;
   refreshing the advertisement displayed in the user interface to generate a refreshed advertisement responsive to the number of user actions received through the user interface exceeding the user action count threshold, the period of time exceeding the minimum period of time since the advertisement was last refreshed in the user interface, and responsive to not allowing advertisement refresh during text entry; and
   refreshing the content in the user interface and not the advertisement if either the number of user actions does not exceed the user action count threshold or the period of time does not exceed the minimum period of time.

2. The method of claim 1, wherein said step of receiving includes:
   receiving user input through the user interface after the period of time has elapsed.

3. The method of claim 1, wherein said step of refreshing the advertisement includes:
   replacing the advertisement provided in the user interface with one or more new advertisements, the remainder of the user interface content being displayed without requiring a content request from a remote source.

4. The method of claim 1, wherein the user interface is a mail system interface provided by a network browser displaying electronic messages addressed to the user in a message list window and a user action consists of one of the following: selecting a message from the message list, moving a message from the message list to a junk folder, moving the message from the message list to a trash folder, composing a new message, replying to one of the messages displayed in the message list window.

5. The method of claim 1, wherein the advertisement is accessed from a server over a network.

6. The method of claim 1, wherein the minimum number of user actions that must be received after the advertisement is initially displayed in the user interface before the advertisement may be refreshed comprises receiving five user actions.

7. The method of claim 1, wherein the user interface is a mail system interface provided by a network browser displaying electronic messages addressed to the user in a message list window, wherein the selected portion of the content comprises a highlighted message from the message list window.

8. The method of claim 7 comprising simultaneously displaying the highlighted message, a preview of the highlighted message and the refreshed advertisement in the mail system interface.

9. A system for providing updated content for a user interface, comprising:
   a first server including:
   a memory device; and
   a processor in communication with the memory device, the first server able to generate a content management file containing advertisement refresh parameters and advertisement refresh rules associated with updating advertisements displayed in the user interface and transmit the content management file, the advertisement refresh parameters including a time parameter and a user action parameter, the time parameter designating a minimum amount of time that must elapse after the advertisement is initially displayed in the user interface before the advertisement may be refreshed, the user action parameter designating a minimum number of actions from a single user that must be detected after the advertisement is initially displayed in the user interface before the advertisement may be refreshed, the advertisement refresh rules not allowing advertisement refresh during text entry, and the advertisement refresh rules allowing refreshing the content in the user interface and not the advertisement if either the number of user actions does not exceed the user action count threshold or the period of time does not exceed the minimum period of time;
   a second server, the second server provides content and advertisements to the user interface, including:
   a memory device for storing the content management file transmitted by the first server; and
   a processor in communication with the memory device, the second server able to receive a plurality of user inputs from a single user through the user interface, including determining which of the plurality of user inputs qualify as one or more user actions,
   receiving a selected portion of the content displayed in the user interface from the user, update the advertisements provided in the user interface based on the advertisement refresh parameters contained in the content management file to generate one or more refreshed advertisements; and
   simultaneously display the selected portion, additional content linked with the selected portion and the one or more refreshed advertisements in the user interface.

10. The system of claim 9, wherein the first server is configured to receive input from an administrator, the parameters derived from the administrator input.

11. The system of claim 9, wherein the first server is configured to generate a plurality of sets of content update parameters, each set configured for a customer group.

12. The system of claim 9, wherein said first server is able to transmit the content update parameters to a client over a network.

13. The system of claim 9, wherein the content update parameters are associated with updating advertisements in a network browser application.

14. The system of claim 9, wherein the second server comprises a plurality of web servers, further comprising:
 a content share server able to receive the content management file containing content update parameters from the first server and provide the content management file containing the content update parameters to said plurality of web servers.

15. The system of claim 14, wherein the content share server is configured to provide a timestamp associated with the content management file.

16. One or more computer readable storage memories having processor readable code embodied on one or more said processor readable storage memories, said processor readable code for programming one or more processors to perform a method, the method comprising:
 providing an advertisement and content in a user interface;
 receiving a plurality of user inputs from a single user through the user interface, including receiving a selected portion of the content provided in the user interface from the user;
 determining which of the plurality of user inputs qualify as one or more user actions;
 determining whether a number of user actions received from the single user through the user interface since the advertisement was initially provided in the user interface exceeds a user action count threshold, wherein the user action count threshold designates a minimum number of user actions that must be received after the advertisement is initially provided in the user interface before the advertisement may be refreshed;
 determining whether a period of time that has elapsed between the time the advertisement was initially provided in the user interface and the number of user actions was received exceeds a minimum period of time, wherein the minimum period of time designates an amount of time that must elapse after the advertisement is initially provided in the user interface before the advertisement may be refreshed; and
 refreshing the advertisement in the user interface to generate a refreshed advertisement responsive to the number of user actions received through in the user interface exceeding the user action count threshold, the period of time exceeding the minimum period of time, and responsive to not allowing advertisement refresh during text entry; and
 refreshing the content in the user interface and not the advertisement if either the number of user actions does not exceed the user action count threshold or the period of time does not exceed the minimum period of time.

17. The one or more computer readable storage memories of claim 16, wherein the user action count threshold and minimum period of time are received from a remote server.

18. The one or more computer readable storage memories of claim 16, wherein said step of refreshing includes:
 refreshing the advertisement without generating a content request for other content for the user interface.

19. The one or more computer readable storage memories of claim 16, wherein said steps of determining the minimum period of time has elapsed, and updating an advertisement in the user interface are performed at a client device.

20. The one or more computer readable storage memories of claim 16, wherein the user action count threshold designates that the number of user actions that must be detected since the advertisement has been provided in the user interface before the advertisement may be refreshed exceeds five user actions.

* * * * *